United States Patent
Lysaght

(10) Patent No.: US 6,871,153 B1
(45) Date of Patent: Mar. 22, 2005

(54) DYNAMIC CALIBRATION QUALIFIER

(75) Inventor: Richard G. Lysaght, Hicksville, OH (US)

(73) Assignee: C.E. Electronics, Inc., Bryan, OH (US)

( * ) Notice: Subject to any disclaimer, the term of this patent is extended or adjusted under 35 U.S.C. 154(b) by 0 days.

(21) Appl. No.: 10/717,765

(22) Filed: Nov. 20, 2003

(51) Int. Cl.[7] .............................................. G01L 27/00
(52) U.S. Cl. ........................ 702/98; 702/41; 702/138; 702/33; 318/432; 318/434; 173/181; 173/180; 81/467; 81/468; 81/469
(58) Field of Search ............................ 702/98, 41, 138, 702/33; 318/432, 434; 173/181, 180; 81/467, 468, 469

(56) References Cited

U.S. PATENT DOCUMENTS

| | | | |
|---|---|---|---|
| 4,791,838 A | * 12/1988 | Bickford et al. | 81/467 |
| 4,864,903 A | * 9/1989 | Bickford et al. | 81/467 |
| 5,592,396 A | * 1/1997 | Tambini et al. | 702/45 |
| 5,689,434 A | * 11/1997 | Tambini et al. | 700/282 |
| 5,903,462 A | * 5/1999 | Wagner et al. | 700/168 |
| 5,937,370 A | * 8/1999 | Lysaght | 702/138 |
| 6,055,484 A | 4/2000 | Lysaght | |
| 6,134,973 A | * 10/2000 | Schoeps | 73/862.23 |
| 6,349,266 B1 | 2/2002 | Lysaght et al. | |
| 6,430,463 B1 | 8/2002 | Lysaght | |
| 6,567,754 B1 | * 5/2003 | Lysaght | 702/41 |
| 6,655,471 B2 | * 12/2003 | Cripe et al. | 173/176 |

* cited by examiner

*Primary Examiner*—John Barlow
*Assistant Examiner*—Anthony T. Dougherty
(74) *Attorney, Agent, or Firm*—Emch, Schaffer, Schaub & Porcello Co., L.P.A.; Patrick P. Pacella

(57) ABSTRACT

This dynamic calibration qualifier relates to a tool monitor and assembly qualifier that verifies that the correct number of fasteners have been properly installed into an assembly. The device monitors an analog signature created by the tool and has the ability to dynamically calibrate itself while the tool is running. In the preferred embodiment, the stored variable is a clutch offset identified during a calibration phase. In a pulse tool, the programmed microprocessor is configured to identify and store the peak pressure of the first three pulses which are averaged together. The clutch offset is added to the average pulse value from which the clutch threshold is generated.

17 Claims, 5 Drawing Sheets

DYNAMIC CALIBRATION QUALIFIER

TECHNICAL FIELD

This invention relates to a tool monitor and assembly qualifier that verifies that the correct number of fasteners have been properly installed into an assembly. When used in conjunction with a pneumatic pulse tool, or direct drive tool containing a mechanical clutch, proper fastener installation and count can be verified. The device monitors an analog signature created by the tool and has the ability to dynamically calibrate itself while the tool is running.

BACKGROUND OF THE INVENTION

U.S. Pat. Nos. 6,055,484 and 5,937,370 represent a recent, significant development in the field of tool monitoring and assembly qualifying. The programmed microprocessor is configured to identify a portion of the signal representative of the analog signal corresponding to a completed cycle. The configuration also allows for identification of an incomplete cycle and a multiple counting of a completed cycle (double-hit). A completed cycle occurs when a tool drives a fastener to completion causing the tool's mechanical clutch to end the cycle. An incomplete cycle occurs when a tool drives a fastener and the clutch is not allowed to complete the cycle by turning the tool off, meaning that the proper torque is never reached. A double-hit occurs when a tool drives a fastener that has previously been tightened to the target torque. The qualifiers and disclosures of U.S. Pat. Nos. 6,055,484 and 5,937,370 are herein incorporated by reference.

The next generation qualifier uses multiple thresholds and multiple timers to perform its operations. This version makes use of up to four thresholds and five timers in order to accomplish its qualification of an assembly process. This system for monitoring analog signatures is a function of the analog signal, and a programmed microprocessor configured to identify a portion of the analog signal corresponding to the parameter. The programmed microprocessor is configured to identify and store the parameter of a first threshold analog signal to begin monitoring and storing the parameter of a cycle. Next, the programmed microprocessor is configured to identify and store the parameter of a second analog level of the tool driving the fastener to its target torque and configured to identify and store the parameter of a third analog level to count a completed cycle when the measured analog signal is in the same as the third identified and stored parameter. Finally, the programmed microprocessor is configured to identify and store the parameter of a fourth analog level which indicates the shut off region of the cycle when the measured analog signal is above the fourth identified and stored parameter. See U.S. Pat. No. 6,567,754 which is herein incorporated by reference.

BRIEF SUMMARY OF THE INVENTION

In these recent developments, the thresholds are fixed entities that are generated during a calibration process. The dynamic threshold of the present invention is generated while the tool is running. In the preferred embodiment, the stored variable is a clutch offset identified during a calibration phase. In a pulse tool, the programmed microprocessor is configured to identify and store the peak pressure of three pulses which are averaged together. In the preferred embodiment, the second, third and fourth pulses were used since pulse one can present some anomalys. The clutch offset is added to the average pulse value from which the clutch threshold is generated.

In the preferred embodiment of a direct drive tool, the programmed microprocessor is configured to identify and store a string of points in a band that indicates a run down phase. The clutch offset is added to the average of these values. The clutch threshold dynamically changes for each run based upon the running pressure of the tool. This makes the monitoring process very forgiving to large changes in pressure.

More specifically, the dynamic calibration system of the invention for monitoring a compressed air driven, pulse tool comprises: a means for measuring air pressure of a pneumatic pulse tool and converting the air pressure into an electrical signal representative of the air pressure; a means for electrically computationally processing the electrical signal into another signal representative at least one parameter corresponding to a condition of the tool being monitored which is a function of air pressure; and a programmed microprocessor configured to identify a portion of the signal representative of the air pressure corresponding to the parameter.

The programmed microprocessor is configured to identify and store the parameter of a first threshold air pressure to begin monitoring the parameter of a cycle; configured to identify and store the parameter of a second air pressure to identify a portion of the signal representative of the air pressure of the tool driving a fastener, and configured to indicate a pulsing region based on the parameter of the second air pressure. The programmed microprocessor also is configured to identify and store a portion of the air pressure as a calibration value for the parameter of the second air pressure; and configured to identify and store the parameter of a dynamic threshold corresponding to the calibration value and configured to identify and store timers to be associated with the parameters.

In the preferred embodiment, the programmed microprocessor is configured to confirm that the measured air pressure in the pulsing region has at least three pulses while the pulse tool is running, configured to identify and store the parameter of three pulses of the pulsing region, and configured to average together the second, third and fourth pulses of the pulsing region to identify an average pulse value. The microprocessor then is configured to identify a percentage of the difference between the highest peak pressure and configured to identify and report a completed fastening process, configured to identify and report a successful fastening when all the conditions of the parameters and timers are satisfied, and configured to identify and report an unsuccessful fastening when at least one condition of the parameters or timers is not satisfied.

DETAILED DESCRIPTION OF THE INVENTION

Figure 1:
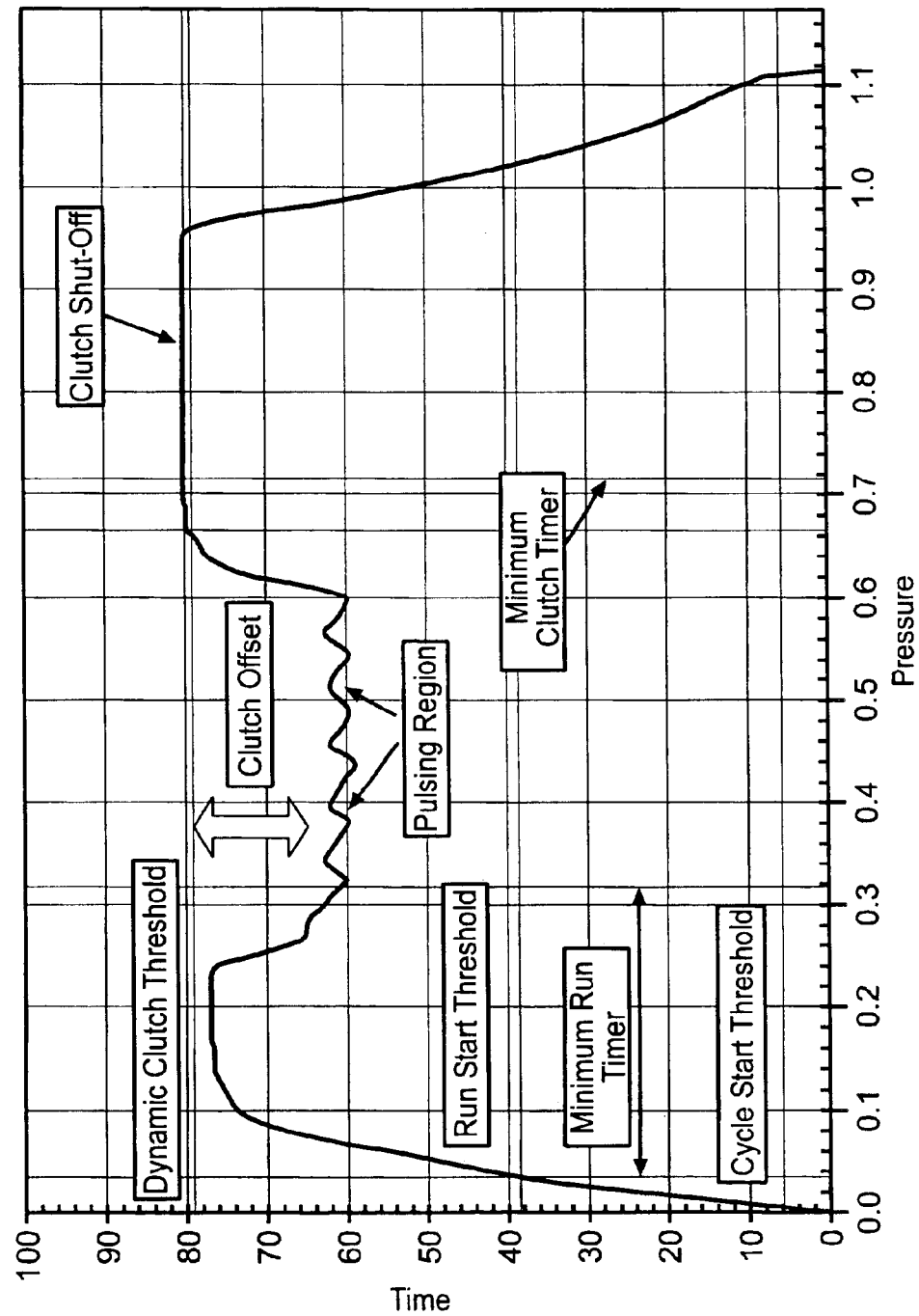
FIG. 1 shows the signature for a conventional pneumatic pulse tool monitored according to this invention.

FIG. 1 is the pneumatic signature of a pulse tool. The system monitors a compressed air driven tool by a means for measuring air pressure. FIG. 1 shows the analog signature from a good fastening process using a pulse tool. There are a few hallmarks in this curve that are worth noticing. This tool was set up to pulse at least four times. If the tool does not pulse at least four times, the qualifier will generate a reject status. Also, at the end of the pulsing phase, the pressure steps up almost to line level. This region indicates the tool's clutch engaged and shut the tool off when torque was achieved.

In an incomplete run, the analog signature does not step up to line pressure at the end of the run. This indicates that the clutch did not engage.

In a double hit, the analog signature immediately steps up to line pressure and stays there. There is a little or no pulsing region. This curve would be typical of a fastener being "hit" again after the fastener had already been tightened to torque.

Figure 2:
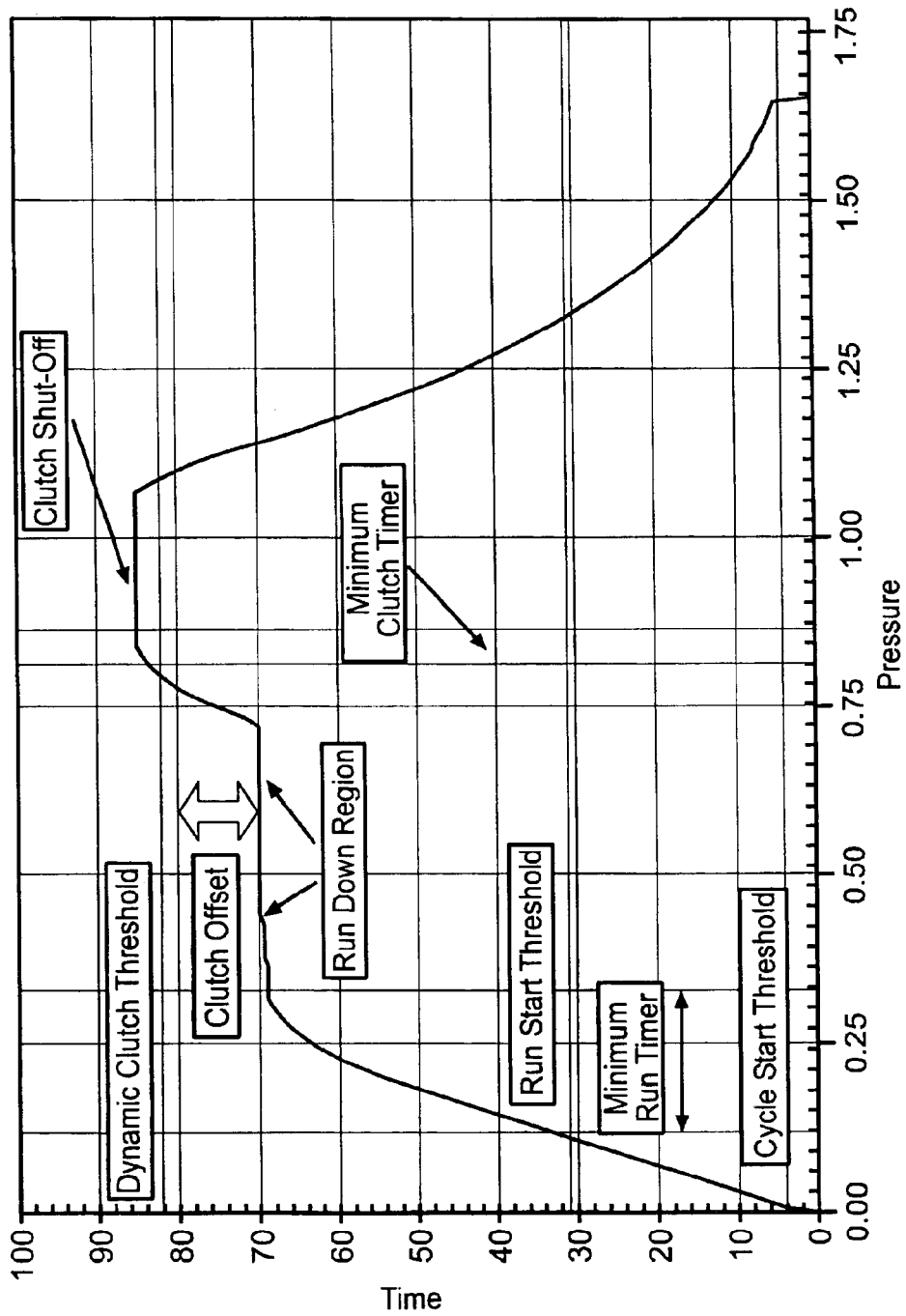
FIG. 2 shows the signature for a conventional direct drive tool monitored according to this invention.

FIG. 2 is the analog signature from a good fastening processing using a direct drive tool. There are two hallmarks in this curve worth noticing. First, during free run the tool runs at a constant pressure which is lower than the shut-off or clutch-out pressure. Then, after to tool's clutch engages the pressure steps up to near line pressure and shows a clutch shut off.

In an incomplete run, the curve does not step up to line pressure at the end of the run. This indicates that the clutch did not engage.

In a double hit, the curve immediately steps up to line pressure and stays there. There is no free run region. This curve would be typical of a fastener being "hit" again after the fastener had already been tightened to torque.

Figure 3:
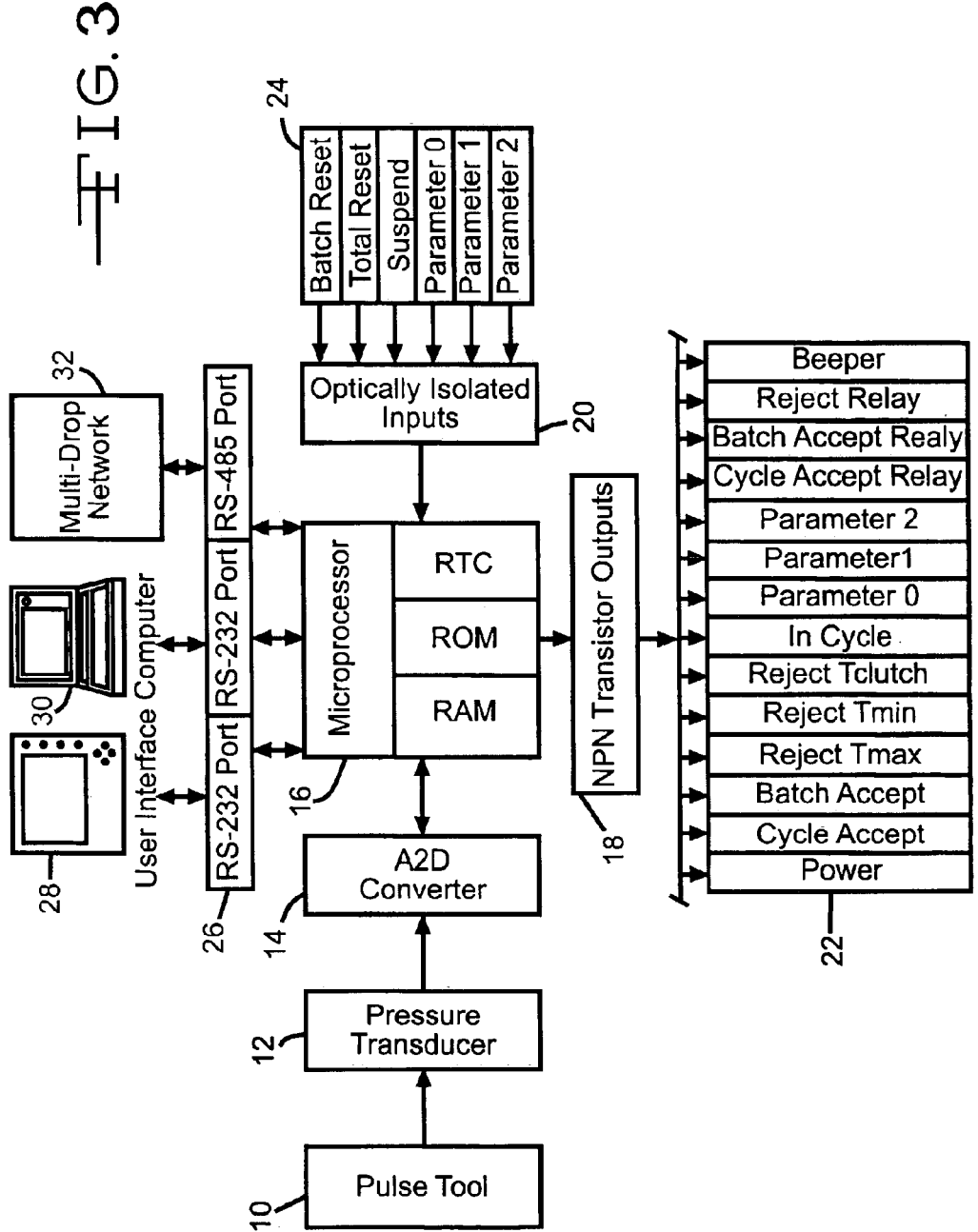
FIG. 3 is a diagram for monitoring the pneumatic pulse tool according to this invention.

FIG. 3 illustrates a pulse tool qualifier according to this invention. FIG. 3 shows pneumatic pulse tool 10 connected to pressure transducer 12. Transducer 12 measures air pressure between tool 10's trigger and pneumatic motor and converts the pressure to electrical signals. A/D converter 14 receives the electrical signal from transducer 12 and coverts them in to binary code for use by microprocessor 16. NPN transistor outputs 18 and optically isolated inputs 20 represent the measured parameter of this invention. Output 18 maybe any of listed outputs 22 and input 20 may be any of listed outputs 24. Ports 26 connect the system to conventional hardware such as user interface 218, computer 30 and network 32.

Figure 4:
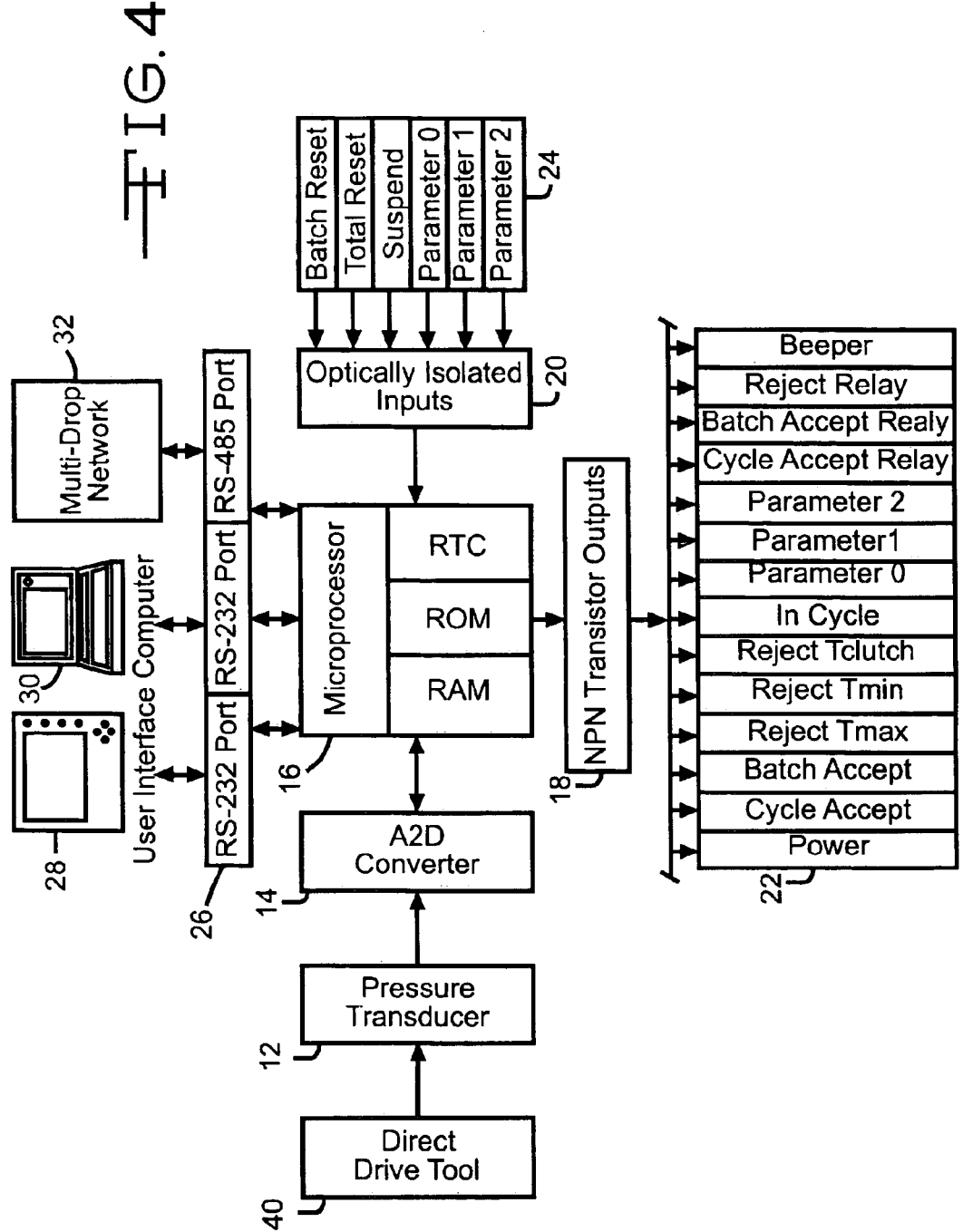
FIG. 4 is a diagram for monitoring the direct drive tool according to this invention.

FIG. 4 illustrates a direct drive qualifier according to this invention. The illustration is the same as FIG. 3 except for direct drive tool 40. Direct drive tool 40 may be a non pulse, pneumatic tool or a tool containing a mechanical clutch. The direct drive tool illustrated is a non-pulse, pneumatic tool the average pulsing value as a clutch offset during a calibration phase, and configured to add the clutch offset to the average pulse value while the tool is running to identify the dynamic threshold corresponding to the calibration value. The microprocessor is configured to identify a percentage of the difference between the highest peak pressure and the average pulsing value as a clutch offset during a calibration phase, and configured to add the clutch offset to the average pulse value while the tool is running to identify the dynamic threshold corresponding to the calibration value. The microprocessor also is configured to report the dynamic threshold corresponding to the calibration value while the tool is running, and configured to use the dynamic threshold to determine when the tool's clutch has activated. The programmed microprocessor further is configured to identify and report a completed fastening process, configured to identify and report a successful fastening when all of the conditions of the parameters and timers are satisfied; and configured to identify and report an unsuccessful fastening when at least one condition of the parameters or timers is not satisfied.

In the preferred embodiment of the direct drive tool, the microprocessor is configured to identify the air pressure associated with a direct drive (non-pulsing) tool running the fastener prior to clutch engagement. The programmed microprocessor then is configured to identify and store the average pressure associated with the tool running the fastener prior to clutch engagement, configured to identify a percentage of the difference between the highest peak pressure and the average running value as a clutch offset during a calibration phase, and configured to add the clutch offset to the average run-down value while the tool is running to identify the dynamic threshold corresponding to the calibration value. The microprocessor also is configured to report the dynamic threshold corresponding to the calibration value while the tool is running, and configured to use the dynamic threshold to determine when the tool's clutch has activated. The programmed microprocessor of the direct drive tool also is.

Once the qualifier is set up properly, it may be powered up. Proper set up assures that a transducer is correctly attached to the tool being monitored and the qualifier.

When the unit powers up, a start-up screen will be displayed momentarily followed by the main run screen. In order to set up any given tool, press the mode key and go to the navigation menu. The navigation screen shows the following.

| | |
|---|---|
| Run Screen | Select Application |
| AutoCal | Application Builder |
| View Run | Sequencing |
| Statistics | Administration |
| Options | I/O Schematic |

With the navigation menu showing, use the arrow keys to highlight the "Options" icon and then use the "Enter" key to select "Options". You may be prompted to enter a password. If so enter it using the numeric keypad. At this point, the Options Screen will appear. From the Options Screen select the Tool Type option by pressing its key. The Tool Type screen will appear at this point. If a Pulse tool is to be monitored, option one (Pulse Pneumatic) should be selected. For all other pneumatic tools, option two (Direct-drive) should be selected.

Pressing the mode key will return the user to the navigation menu.

Before a tool can be monitored properly, the current application must be set up to monitor that tool. The AutoCal option will do this for you automatically. In order to access the AutoCal routine, press the mode key button and go to the navigation screen. From the navigation screen, use the arrow keys to highlight the AutoCal option and then press enter.

The first screen associated with the AutoCal process will inform the user that the tool must be off and also that they should press the "Next" key. This screen also reminds the user which application set is active. The calibration will only effect that application. At this point, make sure the transducer is connected to both the tool and the box and also that the tool is not running. Then press the "Next" softkey.

The second AutoCal screen will appear next. This screen will prompt the user to run a typical fastener and then to press the "Next" softkey. After these steps are completed, the result of the calibration will appear on the screen.

If the calibration was not successful, you may need to check the tool connection to the unit. On the "Run Screen" there is a portion of the window that shows the active pressure within the tool. Check this pressure as the tool is running to see if a change is occurring. Press the mode key to return to the navigation menu.

The final step in setting up any given application is to program the number of fasteners which will be in each batch or group. For example, if this unit is to monitor the fastening of five lug nuts into a car's wheel, the batch might be set to five.

In order to set the batch, press the mode key and go to the navigation menu. From the navigation menu select the "Application Builder" option. These options are:

Application
Th1 Noise Floor
Th2 Run Start
Th3 Shut-off Threshold
T−Minimum Run Time
T+Maximum Run Time
Tc Clutch Timer
Tb Bump Timer
Fasteners per Batch
Total Completed Batches:

Once inside the "Application Builder" menu you'll want to use the up and down arrows on the keypad to highlight the "Fasteners per Batch" option. When the "Fasteners per Batch" option is highlighted, press Enter and a cursor will appear allowing you to edit the value within the option.

While the cursor is flashing, the left and right arrow keys will allow you to highlight any of the three active digits. The number keys will allow you to change any of those digits to the desired value. The batch can be any value between 1 and 255.

Once the batch shows the desired value, press the Save soft-key to save that value. Pressing the mode key button will return the unit to the navigation menu.

In order to reach the "Run Screen" from the navigation menu, use the arrow keys to highlight the "Run Screen" option and then press the Enter button The Run Screen will be the most useful source of information for the tool operator during production.

The Run Screen is the main screen that will be used while the tool is in operation. This screen contains a wealth of information about what is occurring in the assembly process at any given time. From this screen a user can ascertain how many fasteners have been completed towards a batch, the current application, the last fastener status, the pressure within the tool, whether the unit is locked or un-locked, and the total number of batches that have been completed. This screen automatically appears at the end of the power up sequence. This screen may also be reached by selecting the "Run Screen" option from the navigation menu.

Figure 5:
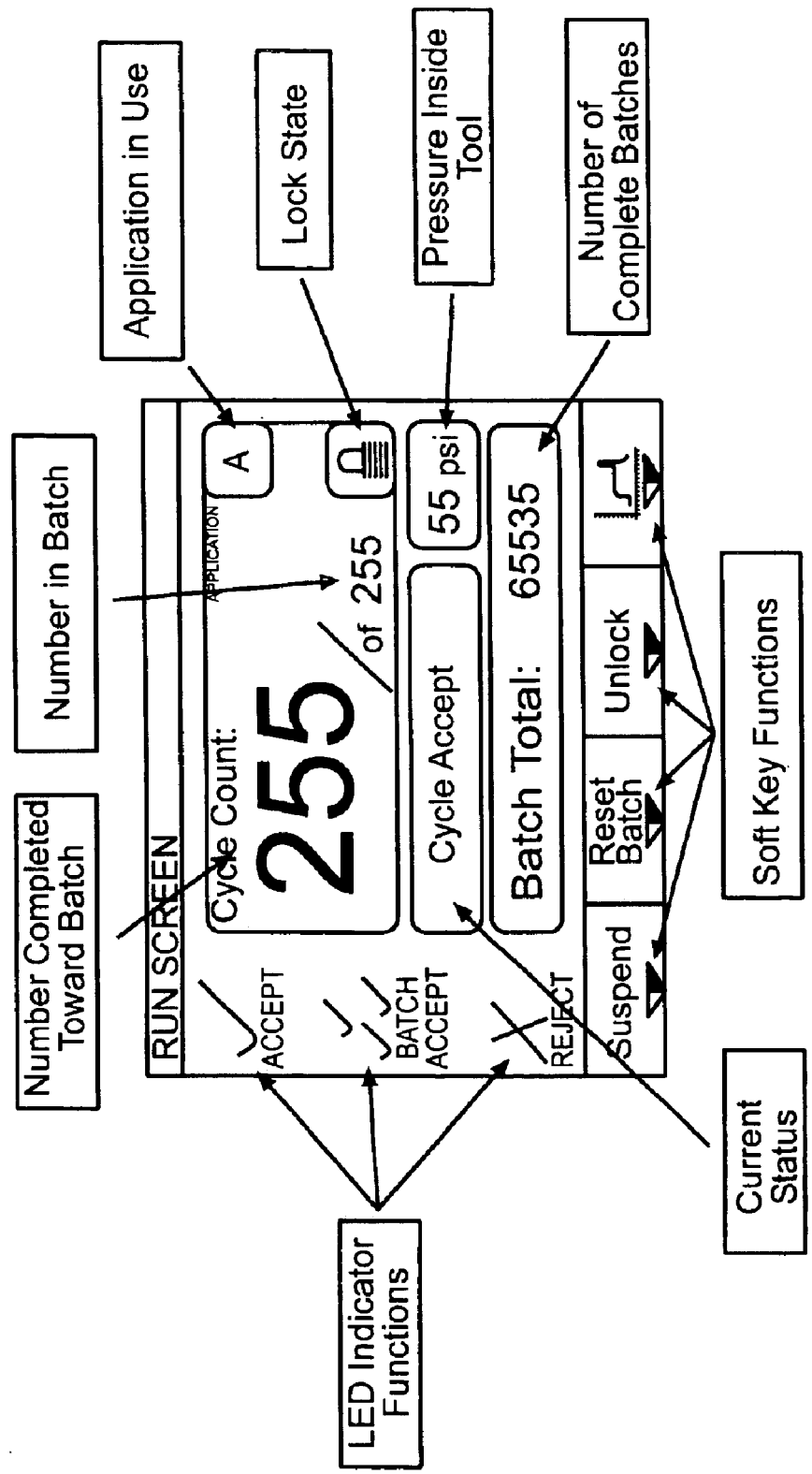
FIG. 5 is a representation of a screen display showing the Run Screen for a qualifier according to this invention.

FIG. 5 is a representation of a screen display showing the Run Screen for a qualifier according to this invention.

The Navigation Menu is the leaping off point to all functions within this unit. The mode key may be pressed at any time, and the Navigation Menu will appear. From the Navigation menu, the user can go to the Run Screen, perform an AutoCal, view a rundown, review statistics, set the units options, select the application in use, adjust any given application, enable sequencing, perform administrative functions, and look at a schematic that aids in external wiring.

In order for this unit to function properly, the thresholds and timers within the application need to be set appropriately with regards to the tool's pneumatic signature. The AutoCal feature provides a very quick and easy means of performing this set-up. To reach the AutoCal function, select "AutoCal" from the navigation menu.

The first screen associated with the AutoCal process will inform the user that the tool must be off and also that they should press the "Next" key. This screen also reminds the user which application set is active. The calibration will only effect that application. At this point, make sure the transducer is connected to both the tool and the box and also that the tool is not running. Then press the "Next" softkey.

The second AutoCal screen will appear next. This screen will prompt the user to run a typical fastener and then to press the "Next" softkey. When running a "typical" fastener, the user should start with the tool off and then run the fastener to its completion allowing the tool's clutch to turn the tool off. The tool's trigger should then be released and left alone until the "NEXT" softkey is pressed on the unit.

After these steps are completed, the result of the calibration will appear on the screen.

If the calibration was not successful, check the tool and transducer connections. The transducer needs to be properly connected to both the tool and the unit in order for the system to function correctly.

The Run Screen may be used to determine if a pressure change is occurring while the tool is running. When the tool it off, the pressure should be near or about 0 psi. While the tool is running, the pressure will be around 50 or 60 psi. When the clutch shuts the tool off, the pressure will rise almost to line pressure.

It's also very important that the appropriate tool type is selected. Pulse tools and direct drive tools are monitored differently. Be sure that the appropriate tool has been selected under the Options screen. A graph of the last run down may be viewed by selecting the "View Run" option from the navigation menu.

While viewing a run, the "1" key may be pressed to draw and erase the thresholds and timers. Pressing the "2" key will draw and erase the tool's signature. If a new fastening cycle is run, the "ENTER" key may be pressed to retrieve and view this new curve.

This unit will hold information pertaining to the last 1000 events. That information can be viewed by going to the "Statistics" screen. In order to reach the "Statistics" screen, highlight the Statistics option on the navigation menu and press "ENTER".

There are five columns worth of information on the Statistics screen. Column one holds the event number. The second column displays the application the unit was using when that event occurred. The date and time that the even occurred is displayed in column three and column four. Column five holds a description of the event itself. The event description will be a Cycle OK, a Batch OK or a Reject.

The Cycle OK status tells you that a single fastening was completed properly. A Batch OK tells you that a single fastening was completed properly and that it was the last fastener in the batch. A Reject status informs the user that for some reason the fastening was rejected. Each Reject status is accompanied with a reason to help you discern why that fastening was rejected.

The soft-keys provide functions that allow a user to view more statistics than can be showed on the screen at one time. The "Page Up" and "Page Down" soft-keys can be pressed to view events that occurred further back in time or more recently. Pressing the "Most Recent" soft-key will place the most recent event at the top of the screen and the events that preceded it directly below.

Pressing the "Exit" soft-key or the mode key will take the unit back to the navigation menu.

Several user adjustable features can be accessed from the "Options" menu. In order to reach the "Options" menu, highlight the Options button on the navigation menu and press the "ENTER" key.

The first item on the Options screen list is Relays. By selecting this option the user can choose to set the relays to "latching" or "momentary". To select "Relays" from the Options screen list either press the "1" key or highlight the "Relays" option and the "ENTER".

Once at the "Relays Options" screen you can choose how the relay outputs are going to act. If the relays are set to momentary, each time an event occurs the corresponding relay will turn on for 200 ms and then turn back off. If the relays are set to latching, the appropriate relay will turn on and remain on when an event occurs. That relay will turn back off at the beginning of the next cycle (the next time the tool starts).

To make a selection on this screen, the number key that corresponds with the selection may be pressed. If you use this number key method, the selection will be made and stored. The screen will also return to the "Options" menu;

A selection may also be made by using the arrow keys or the "UP" and "DOWN" soft-keys to highlight the desired selection and then pressing the "Select" soft-key.

The "EXIT" soft-key, the mode key, or the "ESC" key may be pressed to return to the "Options" screen without making and storing a new selection.

A situation may arise for operating manually. If so, select the "Application Builder" option from the navigation menu. This action will take the unit to the "Application Builder" screen.

To edit an item from the Application Builder, highlight the item you want to edit and then press "ENTER". A cursor will appear. While that cursor is highlighting a digit, use the numeric keypad to alter its value or use the left and right arrows to select a different character. The Application Builder screen includes the following.

| Application Element | Description |
| --- | --- |
| Th1 Noise Floor | Pressure threshold that sets a pressure level for the unit to begin capturing data |
| Th2 Run Start | Pressure threshold that sets a pressure level which after crossed a status will be generated (either accept or reject). |
| Th3 Shut-off Threshold | Offset valve used while calculating a Dynamic threshold for each run down. |
| T − Minimum Run Time | Minimum amount of time the tool must run before clutching out without generating a reject. |
| T + Maximum Run Time | Maximum amount of time tool can run before clutching out without generating a reject. |
| Tc Clutch Timer | Amount of time user must hold tool trigger after tool clutches out without generating a reject. |
| Tb Timer Bump | Timer used to cancel incidental runs in the case of a push to start tool. If this timer is violated without the clutch firing, no status will be generated. AutoCal sets this timer to 0. |
| Fasteners per Batch | Number of fasteners associated with a batch. Every time this number of fasteners is completed, a Batch Accept will be generated. |
| Total Completed Batches | This number represents the number of Batches that have been completed. |

This unit has the ability to automatically switch from application to application if the "Sequencing" feature is enabled. If Sequencing is enabled, the unit will start in Application A. Once the batch is complete in Application A, the unit will automatically switch to Application B. This switching from application to application will continue upon the completion of each batch until the end application is reached.

There are only two options on the Administration screen, one is "Change Password" and the other is "Exit". Choose the "Change Password option by highlighting it and pressing the "ENTER" key.

The final option on the navigation menu is "I/O Schematic" if this option is selected a schematic appears on the screen which shows the function of the 12-pin I/O connector and the circuitry behind it.

Pressing any key while the schematic is being displayed will return the unit to the navigation menu.

In addition to these embodiments, persons skilled in the art can see that numerous modifications and changes may be made to the above invention without departing from the intended spirit and scope thereof.

I claim:

1. A dynamic calibration system for monitoring a direct drive non-pulse tool comprising:

a means for measuring air pressure of a non pulse, direct drive tool and converting the air pressure into an electrical signal representative of the air pressure;

a means for electrically computationally processing the electrical signal into another signal representative at least one parameter corresponding to a condition of the tool being monitored which is a function of air pressure;

a programmed microprocessor configured to identify a portion of the signal representative of the air pressure corresponding to the parameter;

wherein the programmed microprocessor is configured to identify and store the parameter of a first threshold air pressure to begin monitoring the parameter of a cycle;

wherein the programmed microprocessor is configured to identify and store the parameter of a second air pressure to identify a portion of the signal representative of the air pressure of the tool driving a fastener;

wherein the programmed microprocessor is configured to identify the air pressure associated with the tool running the fastener prior to clutch engagement;

wherein the programmed microprocessor is configured to identify a peak air pressure associated with the tool as a clutch shut off;

wherein the programmed microprocessor is configured to identify and store a portion of the air pressure as a calibration value for the parameter of the second air pressure; and wherein the programmed microprocessor is configured to identify and store the parameter of a dynamic threshold corresponding to the calibration value.

2. A system according to claim 1 wherein the programmed microprocessor is configured to identify and store an average pressure associated with the tool in a run down region.

3. A system according to claim 1 wherein the programmed microprocessor is configured to identify and report a completed fastening process, wherein the programmed microprocessor is configured to identify and report a successful fastening when all of the conditions of the parameters and timers are satisfied; and wherein the programmed microprocessor is configured to identify and report an unsuccessful fastening when at least one condition of the parameters or timers is not satisfied.

4. A system according to claim 1 wherein the programmed microprocessor is configured to identify and store an average pressure associated with the tool running the fastener prior to clutch engagement.

5. A system according to claim 4 wherein the microprocessor is configured to identify a percentage of the difference between a highest peak pressure and the average pressure as a clutch offset during a calibration phase.

6. A system according to claim 5 wherein the microprocessor is configured to add the clutch offset to the average pressure while the tool is running to identify the dynamic threshold corresponding to the calibration value.

7. A system according to claim 6 wherein the microprocessor is configured to report the dynamic threshold corresponding to the calibration value while the tool is running.

8. A dynamic calibration system for monitoring a compressed air driven, pulse tool comprising:
- a means for measuring air pressure of a pneumatic pulse tool and converting the air pressure into an electrical signal representative of the air pressure;
- a means for electrically computationally processing the electrical signal into another signal representative at least one parameter corresponding to a condition of the tool being monitored which is a function of air pressure;
- a programmed microprocessor configured to identify a portion of the signal representative of the air pressure corresponding to the parameter;
- wherein the programmed microprocessor is configured to identify and store the parameter of a first threshold air pressure to begin monitoring the parameter of a cycle;
- wherein the programmed microprocessor is configured to identify and store the parameter of a second air pressure to identify a portion of the signal representative of the air pressure of the tool driving a fastener
- wherein the microprocessor is configured to indicate a pulsing region based on the parameter of the second air pressure;
- wherein the programmed microprocessor is configured to identify a peak air pressure associated with the tool as a clutch shut off;
- wherein the programmed microprocessor is configured to identify and store a portion of the air pressure as a calibration value for the parameter of the second air pressure;
- wherein the programmed microprocessor is configured to identify and store the parameter of a dynamic threshold corresponding to the calibration value; and
- wherein the programmed microprocessor is configured to identify and store timers to be associated with the parameters.

9. A system according to claim 8 wherein the programmed microprocessor is configured to identify and report a completed fastening process,
- wherein the programmed microprocessor is configured to identify and report a successful fastening when all of the conditions of the parameters and timers are satisfied; and
- wherein the programmed microprocessor is configured to identify and report an unsuccessful fastening when at least one condition of the parameters or timers is not satisfied.

10. A system according to claim 8, wherein the programmed microprocessor is configured to confirm that the measured air pressure in the pulsing region has at least three pulses while the pulse tool is running.

11. A system according to claim 10 wherein the programmed microprocessor is configured to identify and store the parameter of three pulses of the pulsing region.

12. A system according to claim 11 wherein the microprocessor is configured to average together the three pulses of the pulsing region to identify an average pulse value.

13. A system according to claim 12 wherein the three pulses averaged together are a second, third and fourth pulse of the pulsing region.

14. A system according to claim 12 wherein the microprocessor is configured to identify a percentage of the difference between a highest peak pressure and the average pulsing value as a clutch offset during a calibration phase.

15. A system according to claim 14 wherein the microprocessor is configured to add the clutch offset to the average pulse value while the tool is running to identify the dynamic threshold corresponding to the calibration value.

16. A system according to claim 15 wherein the microprocessor is configured to report the dynamic threshold corresponding to the calibration value while the tool is running.

17. A system according to claim 15 wherein the microprocessor is configured to use the dynamic threshold to determine when the tool's clutch has activated.

* * * * *